United States Patent [19]
Payne

[11] Patent Number: 5,706,586
[45] Date of Patent: Jan. 13, 1998

[54] AIR VENT REGISTER CUTTING GUIDE

[76] Inventor: Dale M. Payne, 106 McKinley Ave., Mt. Vernon, Ohio 43050

[21] Appl. No.: 509,494

[22] Filed: Jul. 31, 1995

[51] Int. Cl.[6] ................................................. G01B 5/14
[52] U.S. Cl. ...................................... 33/563; 33/528
[58] Field of Search ........................ 33/41.1, 42, 485, 33/526, 527, 528, 562, 563, DIG. 10, DIG. 20

[56] References Cited

U.S. PATENT DOCUMENTS

| | | | |
|---|---|---|---|
| 1,612,455 | 12/1926 | McGeorge | 033/528 |
| 3,842,510 | 10/1974 | Elliott | 033/528 |
| 3,855,924 | 12/1974 | Morse, Jr. | 033/563 |
| 4,228,592 | 10/1980 | Badger | 033/DIG. 10 |
| 4,361,964 | 12/1982 | Hennessee | 033/563 |
| 5,188,013 | 2/1993 | Cardinale | 033/DIG. 20 |
| 5,222,303 | 6/1993 | Jardine | 033/528 |

FOREIGN PATENT DOCUMENTS 260556  7/1949  Switzerland ........................ 033/563

*Primary Examiner*—G. Bradley Bennett

[57] ABSTRACT

A guide for cutting an aperture to receive a vent register. The inventive device includes a template defining a rectangular aperture. Spacing members project from opposed sides of the template for positioning the template into a desired orientation relative to an adjoining surface to permit cutting of an aperture through a surface to receive an air vent register.

1 Claim, 3 Drawing Sheets

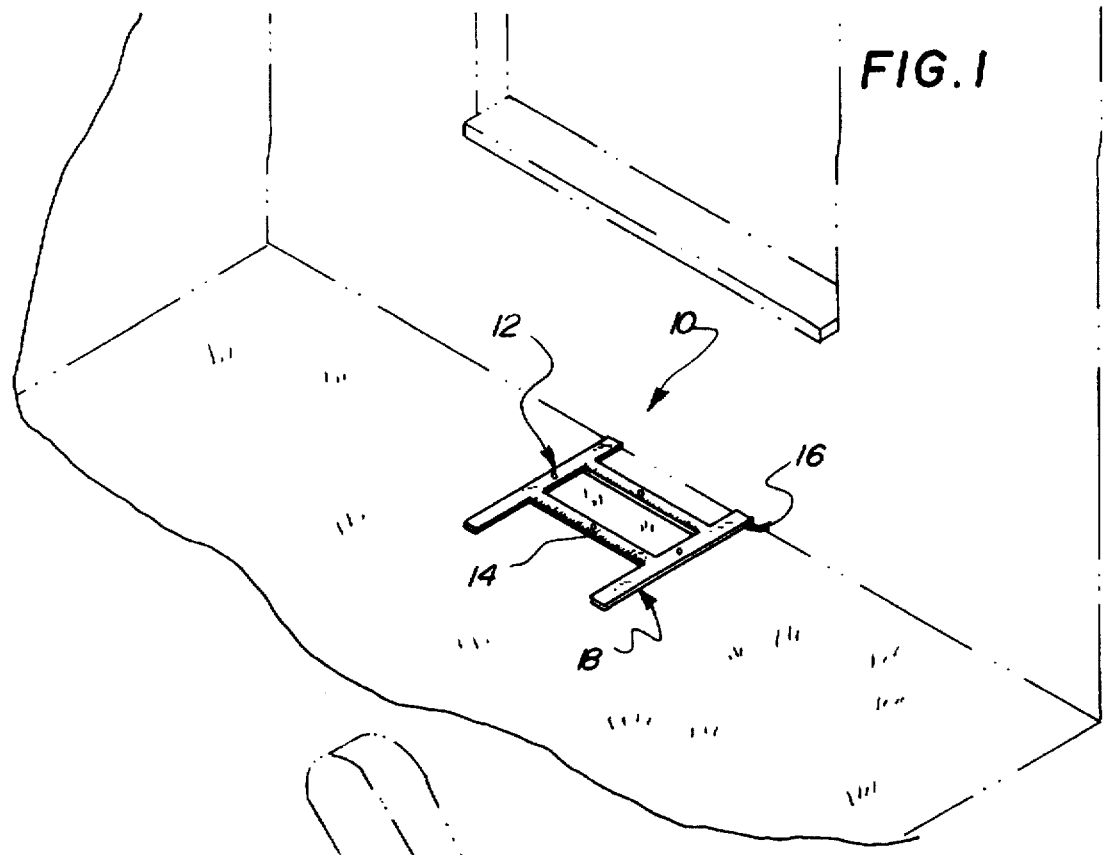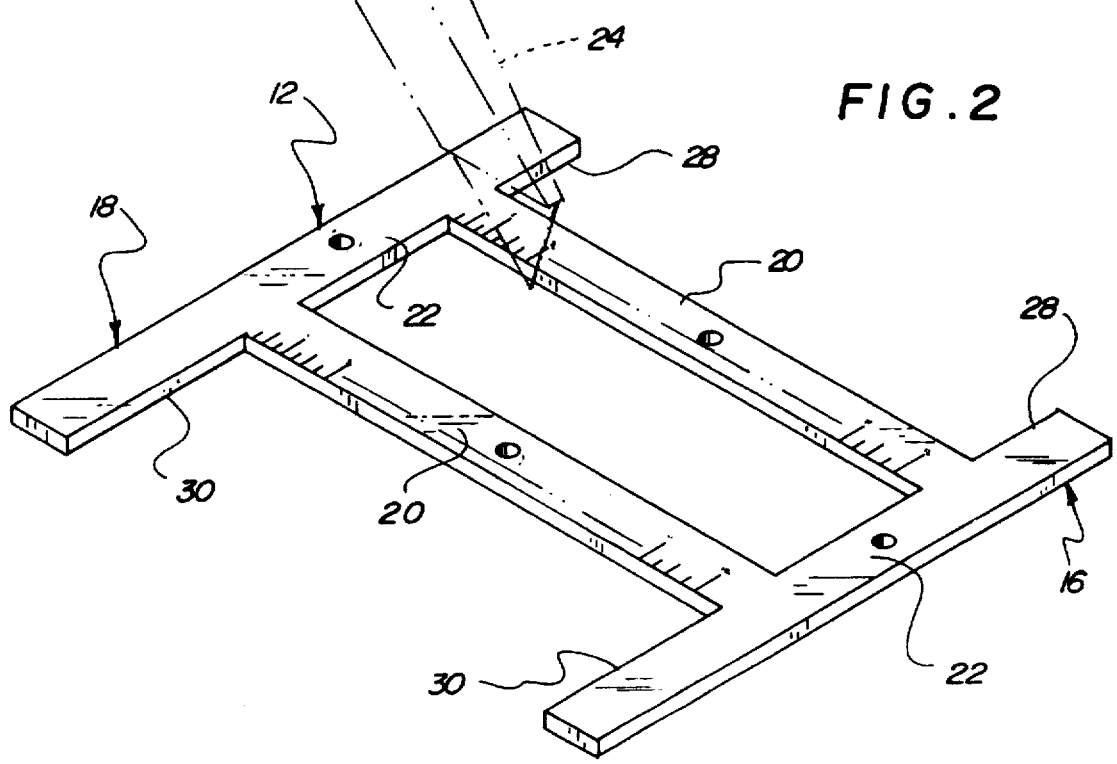

AIR VENT REGISTER CUTTING GUIDE

BACKGROUND OF THE INVENTION

1. Field of the Invention

The present invention relates to template structures and more particularly pertains to a air vent register cutting guide for cutting an aperture to receive a vent register.

2. Description of the Prior Art

The use of template structures is known in the prior art. More specifically, template structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art template structures include U.S. Pat. Nos. 5,195,249; 4,345,381; 5,172,483; 5,040,304; and 4,338,724.

While these devices fulfill their respective, particular objectives and requirements, the aforementioned patents do not disclose an air vent register cutting guide for cutting an aperture to receive a vent register which includes a template defining a rectangular aperture therethrough, and a spacing members projecting from opposed sides of the template for positioning the template into a desired orientation relative to an adjoining surface to permit cutting of an aperture through a surface to receive an air vent register.

In these respects, the air vent register cutting guide according to the present invention substantially departs from the conventional concepts and designs of the prior art, and in so doing provides an apparatus primarily developed for the purpose of cutting an aperture to receive an air vent register.

SUMMARY OF THE INVENTION

In view of the foregoing disadvantages inherent in the known types of template structures now present in the prior art, the present invention provides a new air vent register curing guide construction wherein the same can be utilized for cutting an aperture in a surface to receive a vent register. As such, the general purpose of the present invention, which will be described subsequently in greater detail, is to provide a new air vent register curing guide apparatus and method which has many of the advantages of the template structures mentioned heretofore and many novel features that result in a air vent register cutting guide which is not anticipated, rendered obvious, suggested, or even implied by any of the prior art template structures, either alone or in any combination thereof.

To attain this, the present invention generally comprises a guide for cutting an aperture to receive a vent register. The inventive device includes a template defining a rectangular aperture. Spacing members project from opposed sides of the template for positioning the template into a desired orientation relative to an adjoining surface to permit cutting of an aperture through a surface to receive an air vent register.

There has thus been outlined, rather broadly, the more important features of the invention in order that the detailed description thereof that follows may be better understood, and in order that the present contribution to the art may be better appreciated. Them are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carded out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new air vent register cutting guide apparatus and method which has many of the advantages of the template structures mentioned heretofore and many novel features that result in an air vent register cutting guide which is not anticipated, rendered obvious, suggested, or even implied by any of the prior art tool guides, either alone or in any combination thereof.

It is another object of the present invention to provide a new air vent register cutting guide which may be easily and efficiently manufactured and marketed.

It is a further object of the present invention to provide a new air vent register cutting guide which is of a durable and reliable construction.

An even further object of the present invention is to provide a new air vent register cutting guide which is susceptible of a low cost of manufacture with regard to both materials and labor, and which accordingly is then susceptible of low prices of sale to the consuming public, thereby making such air vent register cutting guides economically available to the buying public.

Still yet another object of the present invention is to provide a new air vent register cutting guide which provides in the apparatuses and methods of the prior art some of the advantages thereof, while simultaneously overcoming some of the disadvantages normally associated therewith.

Still another object of the present invention is to provide a new air vent register cutting guide for cutting an aperture to receive a vent register.

Yet another object of the present invention is to provide a new air vent register cutting guide which includes a template defining a rectangular aperture therethrough, and a spacing members projecting from opposed sides of the template for positioning the template into a desired orientation relative to an adjoining surface to permit cutting of an aperture through a surface to receive an air vent register.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of an air vent register cutting guide according to the present invention in use.

FIG. 2 is an isometric illustration of the invention.

DESCRIPTION OF THE PREFERRED EMBODIMENT

Figure 3:
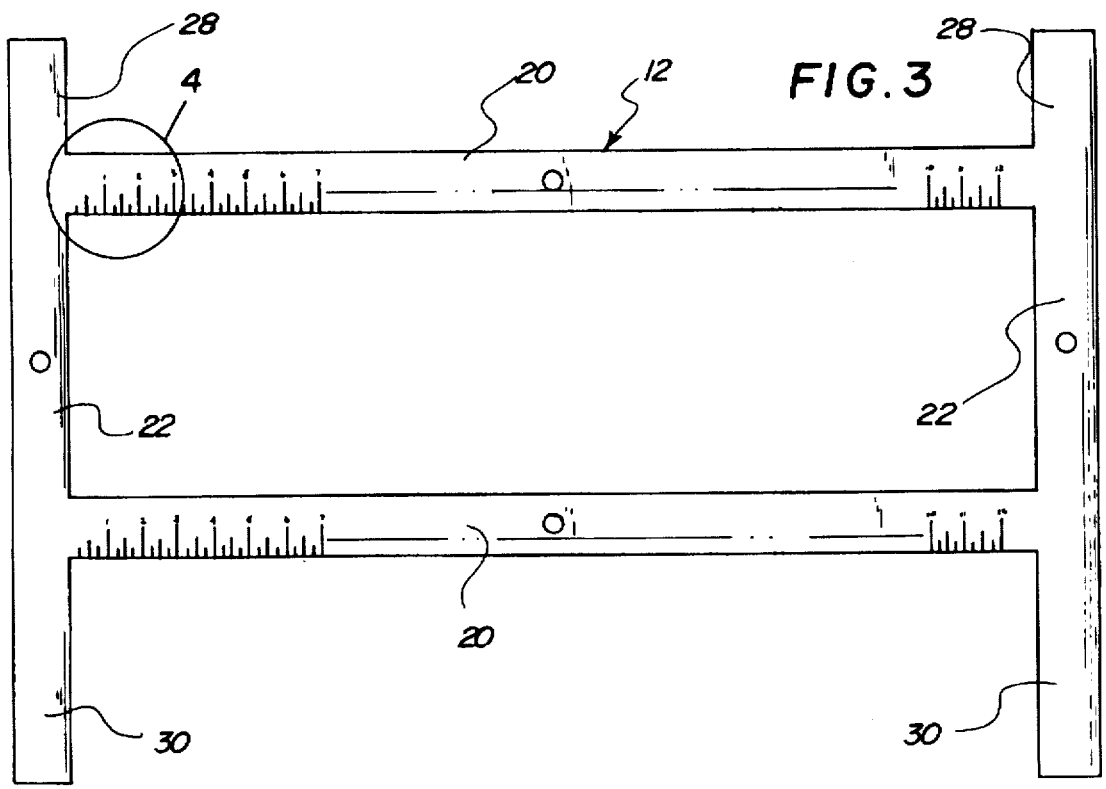
FIG. 3 is a top plan view thereof.

With reference now to the drawings, and in particular to FIGS. 1–6 thereof, a new air vent register cutting guide embodying the principles and concepts of the present invention and generally designated by the reference numeral 10 will be described.

More specifically, it will be noted that the air vent register cutting guide 10 comprises a template 12 defining a rectangular aperture 14 directed therethrough substantially as shown in FIGS. 1 and 2 of the drawings. A first spacing means 16 extends from the template 12 for positioning the template into predetermined first spacing relative to an adjoining wall surface when the device 10 is utilized as shown in FIG. 1 of the drawings. A second spacing means 18 extends from an opposed side of the template 12 relative to the first spacing means 16 for positioning the template 12 into a predetermined second spacing from an adjoining wall surface. By this structure, the rectangular aperture 14 of the template 12 can be positioned into a desired predetermined spacing from an adjoining wall surface so as to permit cutting of rectangular aperture through carpet or like materials residing upon a floor surface or the like to permit installation of a vent register therethrough.

Figure 4:
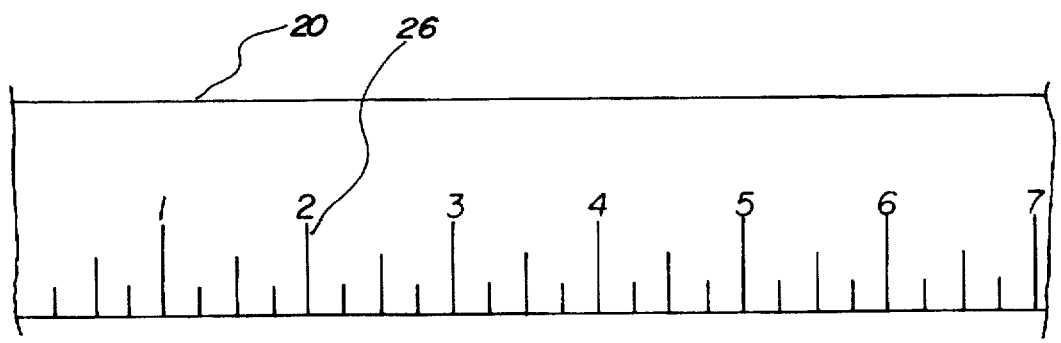
FIG. 4 is an enlarged top plan view of the area set forth in FIG. 3.

Referring now to FIGS. 2 through 4 wherein the present invention 10 is illustrated in detail, it can be shown that the template 12 of the present invention 10 preferably comprises a pair of elongated longitudinal template members 20 positioned in a substantially spaced and parallel orientation. The longitudinal template members 20 are of an equal length relative to one another, with the template 12 further including lateral template members 22 of equal length extending substantially orthogonally between opposed longitudinal ends of the longitudinal template members 20 so as to define a substantially rectangular shape of the template 12 with the rectangular aperture 14 being directed through the template 12 between the longitudinal and lateral template members 20 and 22. By this structure, a knife 24 such as is shown in FIG. 2 can be traversed along interior edges of the template members 20 and 22 to effect cutting of a surface positioned beneath the template 12 such as carpeting or the like.

As shown in FIGS. 3 and 4, the template members 20 and 22 may include measurement indicia 26 printed thereon for facilitating measured cutting along interior edges thereof. Although the measurement indicia 26 is only illustrated along the longitudinal template members 20, it is within the intent and purview of the present invention 10 to include measurement indicia 26 printed along the lateral template members 22 if so desired.

Referring now to FIGS. 2 and 3, it can be shown that the first spacing means 16 of the present invention 10 preferably comprises a pair of first lateral spacing members 28 which extend from opposed ends of a first one of the longitudinal template members 20. Preferably, the first lateral spacing members 28 extend into contiguous communication with the lateral template members 22 and may be integrally formed therewith. The first lateral spacing members 28 are of an equal length so as to facilitate parallel positioning of the first one of the longitudinal template members 20 in a spaced orientation relative to an adjoining wall surface of a building structure when the device 10 is utilized as shown in FIG. 1 of the drawings. The second spacing means 18 similarly comprises a pair of second lateral spacing members 30 projecting from opposed ends of a second one of the longitudinal template members 20. The second lateral spacing members 30 extend into contiguous communication with the lateral template members 22 and may be integrally formed therewith. The second lateral spacing members 30 are of a longitudinal length substantially greater than a longitudinal length of the first lateral spacing members 28 so as to facilitate parallel positioning of the second one of the longitudinal template members 20 into a greater spacing from an adjoining wall surface when the device 10 is utilized as shown in FIG. 1.

Figure 5:
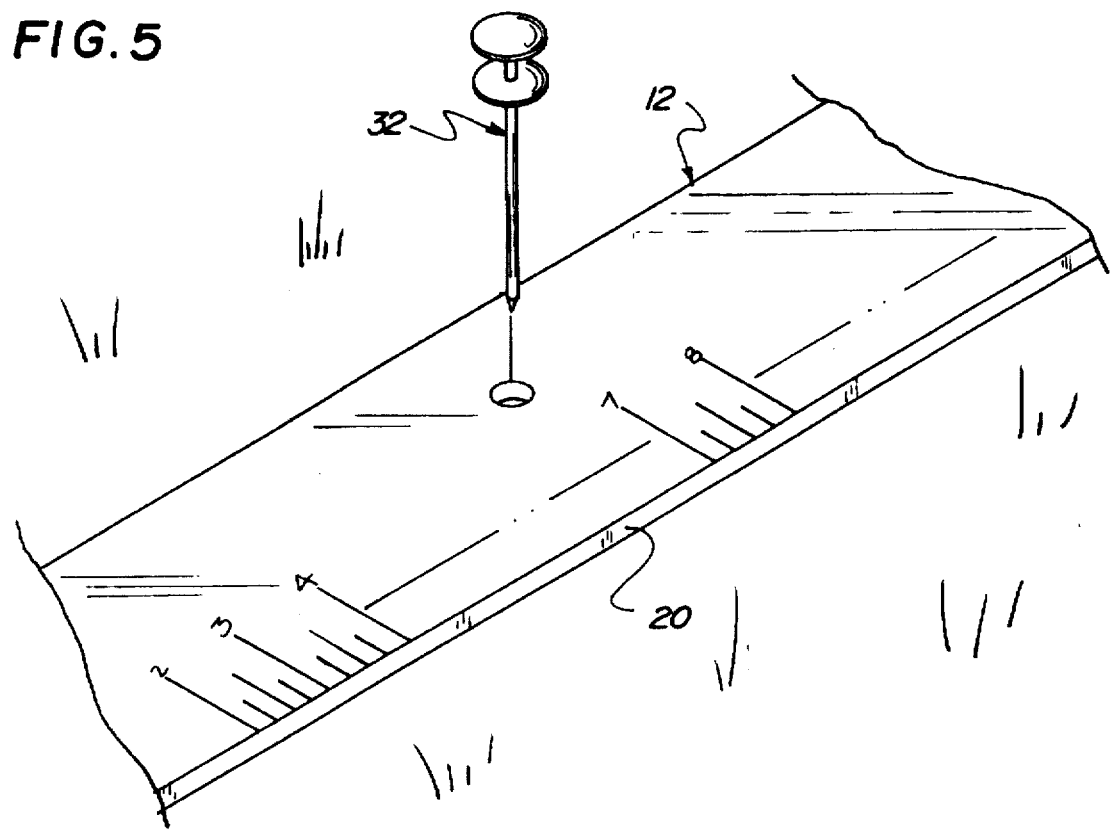
FIG. 5 is an enlarged isometric illustration of a portion of the present invention including a securing tack.
Figure 6:
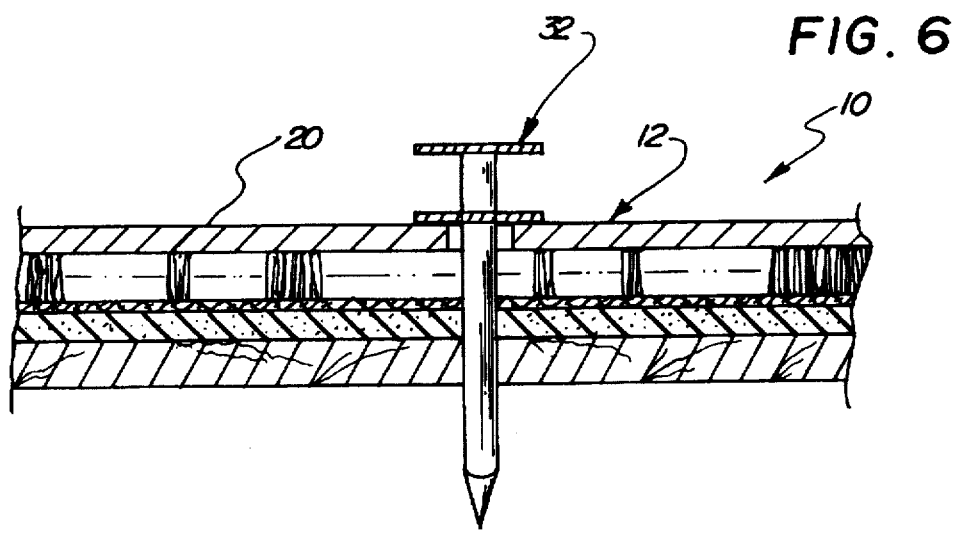
FIG. 6 is a cross sectional view of a portion of the present invention in use.

Referring now to FIGS. 5 and 6, it can be shown that the present invention 10 may further comprise unlabeled means for securing the template 12 to a substrate. To this end, the template members 20 and 22 can be shaped so as to define unlabeled mounting apertures directed therethrough permitting passage of a securing tack 32 through the template 12 and into a substrate positioned therebeneath. Preferably, the securing tack 32 includes an unlabeled pair of substantially spaced and parallel heads positioned along an upper surface of a shank thereof which permit for ease of removal of the securing tack 32 subsequent to use of the device 10. By this structure, the present invention 10 can be secured to a substrate or floor surface, whereby the specific configuration of the securing tack 32 permits for ease of subsequent separation therefrom.

The template 12 of the present invention 10 can be configured so as to define any desired size of rectangular aperture 14 directed therethrough. Preferably, the rectangular aperture 14 is slightly larger than a corresponding size of a register to be installed therethrough. To this end, both longitudinal and transverse dimensions of the rectangular aperture 14 directed through the template 12 are preferably one-eighth of an inch greater than the size of the register to be installed. For example a four inch by ten inch register size would have a template rectangular aperture 14 of four and one-eighths inch by ten and one-eighth inch directed therethrough. The specific configuration of the spacing means 16 and 18 should be such so as to position the template 12 either three inches or five inches away from an adjacent wall surface, respectively.

In use, the air vent register cutting guide 10 of the present invention can be easily utilized for cutting an aperture into a floor or wall surface so as to permit for a subsequent installation of an air vent register thereinto. The present invention 10 may be utilized in the cutting of wall panels, floor panels, floor covering, carpets, or the like as desired by an end user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An air vent register cutting guide comprising;
   a template defining a rectangular aperture directed therethrough, the template comprises a pair of elongated longitudinal template members positioned in a substantially spaced and parallel orientation, the longitudinal template members being of an equal length relative to one another; and lateral template members of equal length extending substantially orthogonally between opposed longitudinal ends of the longitudinal template members so as to define a substantially fixed rectangular shape of the template with the rectangular aperture being directed through the template between the longitudinal and lateral template members;
   wherein both longitudinal and traverse dimensions of the rectangular aperture directed through the template are one eighth of an inch greater than a size of a register to be installed;
   a first spacing means extending from the template for positioning the template into predetermined first spacing relative to an adjoining wall surface, the first spacing means including a pair of first lateral spacing members extending from opposed ends of a first one of the longitudinal template members, the first lateral spacing members being of an equal length so as to facilitate parallel positioning of the first one of the longitudinal template members in a spaced orientation relative to an adjoining wall surface, wherein the first lateral spacing member extend into contiguous communication with the lateral template members;
   a second spacing means extending from an opposed side of the template relative to the first spacing means for positioning the template into a predetermined second spacing from an adjoining wall surface, the second spacing means including a pair of second lateral spacing members projecting form opposed ends of a second one of the longitudinal template members, the second lateral spacing member being of a longitudinal length substantially greater than a longitudinal length of the first lateral spacing members;
   said template members including measurement indicia printed thereon for facilitating measured cutting along interior edges thereof; and
   means for securing the template to a substrate including mounting apertures directed through each of the template members and a plurality of securing tacks directed through the template mounting apertures, the securing tacks each having a shank with a pair of substantially spaced an parallel heads positioned at an upper surface of a shank thereof;
   said apertures including a first pair of apertures centrally formed in each of the longitudinal template members and a second pair of apertures centrally formed in each of the lateral template members.

* * * * *